US009857596B2

(12) United States Patent
Drinkwater et al.

(10) Patent No.: US 9,857,596 B2
(45) Date of Patent: Jan. 2, 2018

(54) STRAP ASSEMBLY WITH FLEX CIRCUIT FOR A HEAD MOUNTED DISPLAY

(71) Applicant: Oculus VR, LLC, Menlo Park, CA (US)

(72) Inventors: Jared I. Drinkwater, Auburn, WA (US); Robin Michael Miller, Redmond, WA (US); Lesley Ribble Magrath, Seattle, WA (US); Blake Francis Andersen, Snoqualmie, WA (US)

(73) Assignee: Oculus VR, LLC, Menlo Park, CA (US)

( * ) Notice: Subject to any disclaimer, the term of this patent is extended or adjusted under 35 U.S.C. 154(b) by 104 days.

(21) Appl. No.: 14/937,773

(22) Filed: Nov. 10, 2015

(65) Prior Publication Data
US 2017/0131555 A1 May 11, 2017

(51) Int. Cl.
*G09G 5/00* (2006.01)
*G02B 27/01* (2006.01)

(52) U.S. Cl.
CPC .. *G02B 27/0176* (2013.01); *G02B 2027/0178* (2013.01)

(58) Field of Classification Search
USPC .............. 345/8, 158, 173, 428, 419, 7, 156
See application file for complete search history.

(56) References Cited

U.S. PATENT DOCUMENTS

| 2011/0239142 | A1* | 9/2011 | Steeves | G06F 3/14 715/764 |
|---|---|---|---|---|
| 2014/0210828 | A1* | 7/2014 | Fleizach | G06F 3/0488 345/467 |
| 2015/0153893 | A1* | 6/2015 | Park | G06F 3/0488 345/173 |
| 2015/0212647 | A1* | 7/2015 | Kim | G02B 27/017 345/173 |
| 2015/0293592 | A1* | 10/2015 | Cheong | G06F 3/016 345/173 |
| 2015/0301360 | A1* | 10/2015 | Chow | G02C 11/10 351/158 |
| 2015/0370455 | A1* | 12/2015 | Van Os | G06F 3/04842 345/173 |
| 2016/0018942 | A1* | 1/2016 | Kang | G06F 3/0416 345/173 |
| 2016/0062592 | A1* | 3/2016 | Jung | G06F 3/04845 345/173 |
| 2016/0063767 | A1* | 3/2016 | Lee | G06T 19/006 345/419 |
| 2016/0091720 | A1* | 3/2016 | Stafford | G02B 27/0172 345/8 |
| 2016/0098082 | A1* | 4/2016 | Hong | G06F 3/012 345/173 |
| 2016/0133170 | A1* | 5/2016 | Fateh | G06F 3/147 345/428 |

* cited by examiner

*Primary Examiner* — Thuy Pardo
(74) *Attorney, Agent, or Firm* — Perkins Coie LLP

(57) ABSTRACT

Head mounted displays are disclosed herein. In various embodiments, a head mounted display includes a front display module and a strap assembly. The strap assembly includes first and second connector arms coupling the strap assembly to the front display module. The head mounted display further includes a flex circuit for providing power and control to an electronic component coupled to the strap assembly. The flex circuit can deflect to allow the strap assembly to move relative to the front display module without damaging the flex circuit.

19 Claims, 4 Drawing Sheets

STRAP ASSEMBLY WITH FLEX CIRCUIT FOR A HEAD MOUNTED DISPLAY

TECHNICAL FIELD

This patent application is directed to head mounted displays and, more specifically, to head mounted displays with strap assemblies coupled to electronic components.

BACKGROUND

Head mounted displays (HMDs) are generally configured to be worn on a user's head and adjustably positioned over a portion of a user's face. HMDs often include a front display module and are secured in position on a user's head with a strap assembly. There is a need for a versatile HMD that includes electronic circuitry connecting the front display and the strap assembly that can deflect or flex to allow the front display module to be moved in various positions relative to the strap assembly and/or the user's head.

BRIEF DESCRIPTION OF THE DRAWINGS

Embodiments of a head mounted display (HMD) with straps, a front display module, and a flex circuit introduced herein may be better understood by referring to the following Detailed Description in conjunction with the accompanying drawings, in which like reference numerals indicate identical or functionally similar elements.

Figure 1:
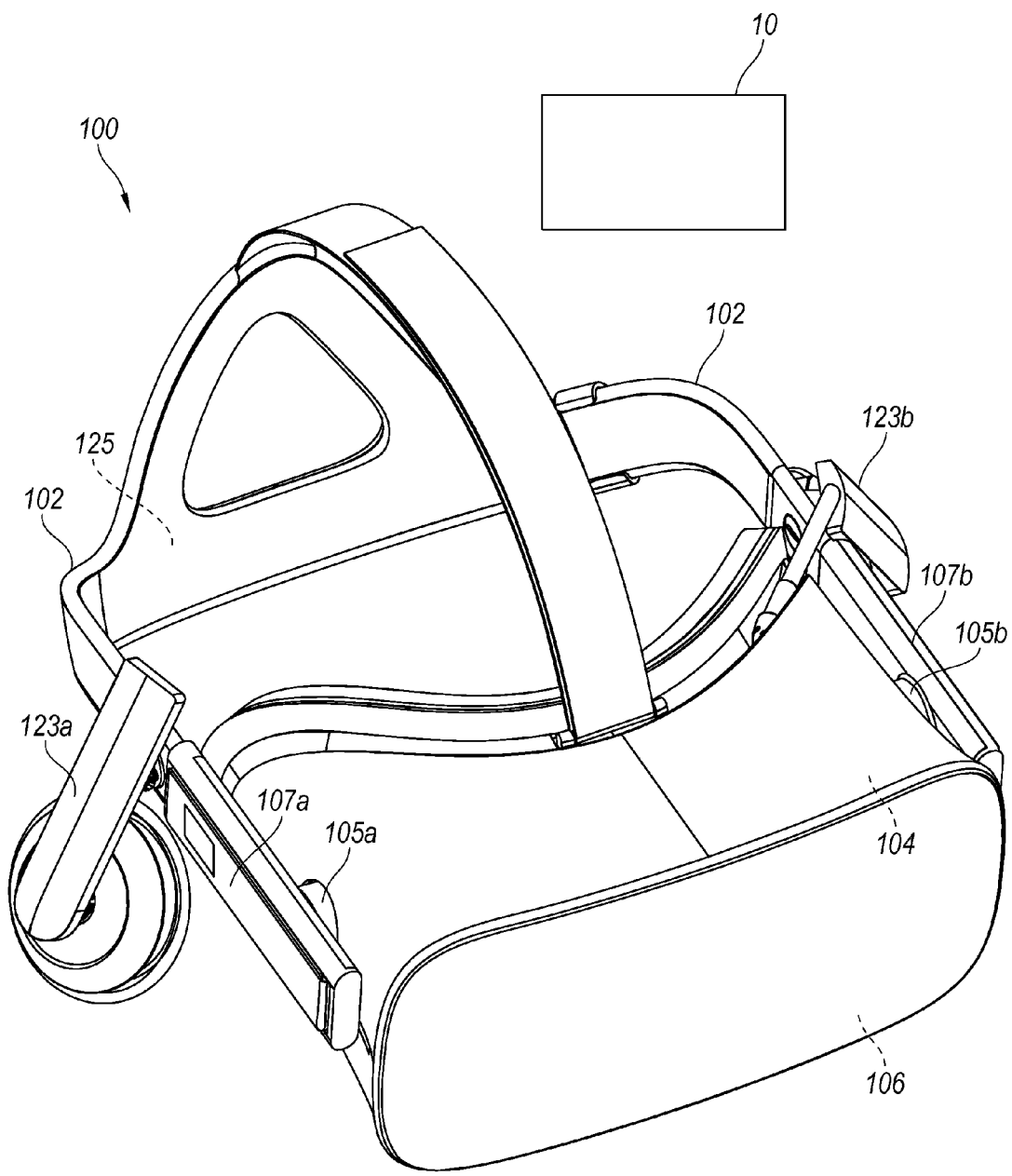
FIG. 1 is an isometric view of a HMD in accordance with an embodiment of the present technology.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of the embodiments.

DETAILED DESCRIPTION

Overview

A HMD with a front display module electrically connected to a strap assembly with a flex circuit is disclosed. The flex circuit is connected to the front display module and the strap assembly to provide power and control to electronic components coupled to the strap assembly. The flex circuit extends from the front display module and through the strap assembly and is configured to allow the strap assembly to move relative to the front display module as the HMD is positioned over or removed from a user's face.

General Description

Various examples of the devices introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

FIG. 1 is an isometric view of a head mounted display (HMD) 100 in accordance with an embodiment of the present technology. The HMD 100 is configured for use with a virtual reality system 10, which may include a conventional virtual reality system coupled to the HMD 100 in a wired or wireless configuration. The HMD 100 of the illustrated embodiment includes a front display module 101 and a strap assembly 103 operatively coupled to the front display module 101 with connectors or joints 105 (e.g., friction joints). The front display module 101 contains optics 104 and one or more displays 106 operatively coupleable to the virtual reality system 10. The strap assembly 103 includes one or more head straps 102 connected to a pair of substantially stiff, torsionally rigid connector arms 107 (shown individually as a right-side connector arm 107a and a left-side connector arm 107b) at opposing sides of the strap assembly 103. The strap assembly 103 also includes various electrical components coupled to or located within the strap assembly 103. For example, the strap assembly 103 includes a pair of speakers or audio output devices 123 (shown individually as a right-side speaker assembly 123a and a left-side speaker assembly 123b) and a rear LED module 125 with a constellation or system of LEDs and/or other sensor elements. The strap assembly 103 has at least one flex circuit 127 (FIG. 2A), as described in more detail below, interconnecting the front display module 101 and the electrical components of the strap assembly 103 to provide power, control, and/or data to or from the electronic components.

The connector arms 107 couple the strap assembly 103 to opposing lateral sides of the front display module 101 at respective joints 105 (shown individually as a right-side joint 105a and a left-side joint 105b). The connector arms 107 are adjustable to allow a user to axially adjust the effective length of the strap assembly 103 relative to the front display module 101 to properly fit the shape and size of the user's head and to securely and comfortably retain the front display module 101 against the front of the user's face and over the user's eyes. The joints 105 on opposing sides of the front display module 101 allow a user to tilt, pivot, or otherwise rotate at the joints 105 to adjust the front display module 101 to one or more selected positions (e.g., angles) relative to the strap assembly 103 and user's head. The joints 105 can retain the front display module 101 at the selected position via frictional engagement until the user tilts or otherwise re-adjusts the front display module 101 to a different selected position relative to the strap assembly 103 and a user's face.

The connector arms 107 of the illustrated embodiment are very stiff and do not substantially flex, such that they react torsional loads that may be generated as the frictional forces in the joints 105 are overcome when the front display module 101 is rotated relative to the strap assembly 103. The connector arms 107, however, are axially extendible or adjustable to allow the effective length of the sides of the strap assembly 103 to change as needed to accommodate different head sizes of various users and/or movement of the front display module 101 relative to portions of the strap assembly 103. The axially extendible connector arms 107 also allow for movement of the front display module 101 toward or away from the back of the back of the head straps to accommodate installation, removal, and/or adjustment of the display module 101 on a user's head.

Figure 2A:
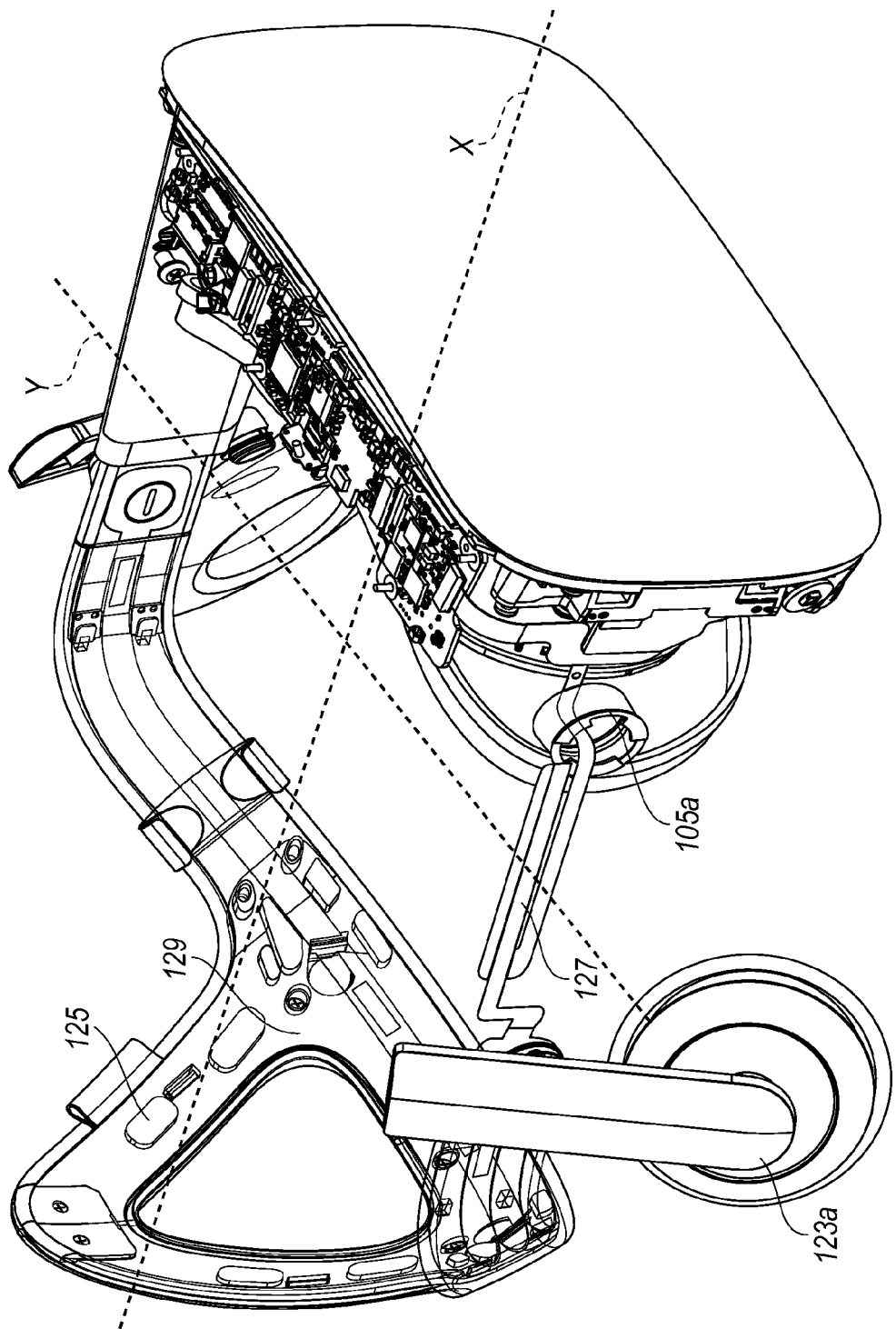
FIG. 2A is an enlarged partial isometric view of a portion of the HMD of FIG. 1 illustrating a strap assembly with an integral flex circuit, wherein portions of a strap assembly and front display module are not shown for purposes of clarity.

FIG. 2A shows an overall path of the flex circuit 127 through the HMD 100 of FIG. 1 with portions of the strap assembly 103 and front display module 101 not shown, removed, or transparent for simplicity and to avoid obscuring features of the HMD 100. The flex circuit 127 of the illustrated embodiment extends from the front display module 101 through the right-side joint 105a and into the right-side connector arm 107a. The flex circuit 127 continues along a right side of the strap assembly 103 and is electrically connected to the right-side speaker assembly 123a. The flex circuit 127 extends away from the speaker assembly 123a, through a rear portion 129 of the strap assembly 103, and to the left side of the strap assembly 103 where it electrically connects to the left-speaker assembly 123b. The flex circuit 127 is electrically connected to the rear LED module 125 on the rear portion 129 of the strap assembly 103. Although the illustrated embodiment is shown and discussed with the flex circuit 127 connected to the front display module 101 on the right side, other embodiments can have the flex circuit 127 connected to the front display module 101 on the right side. In yet other embodiments, the flex circuit 127 can be connected to the front display module 101 on each of the left and right sides.

Figure 2B:
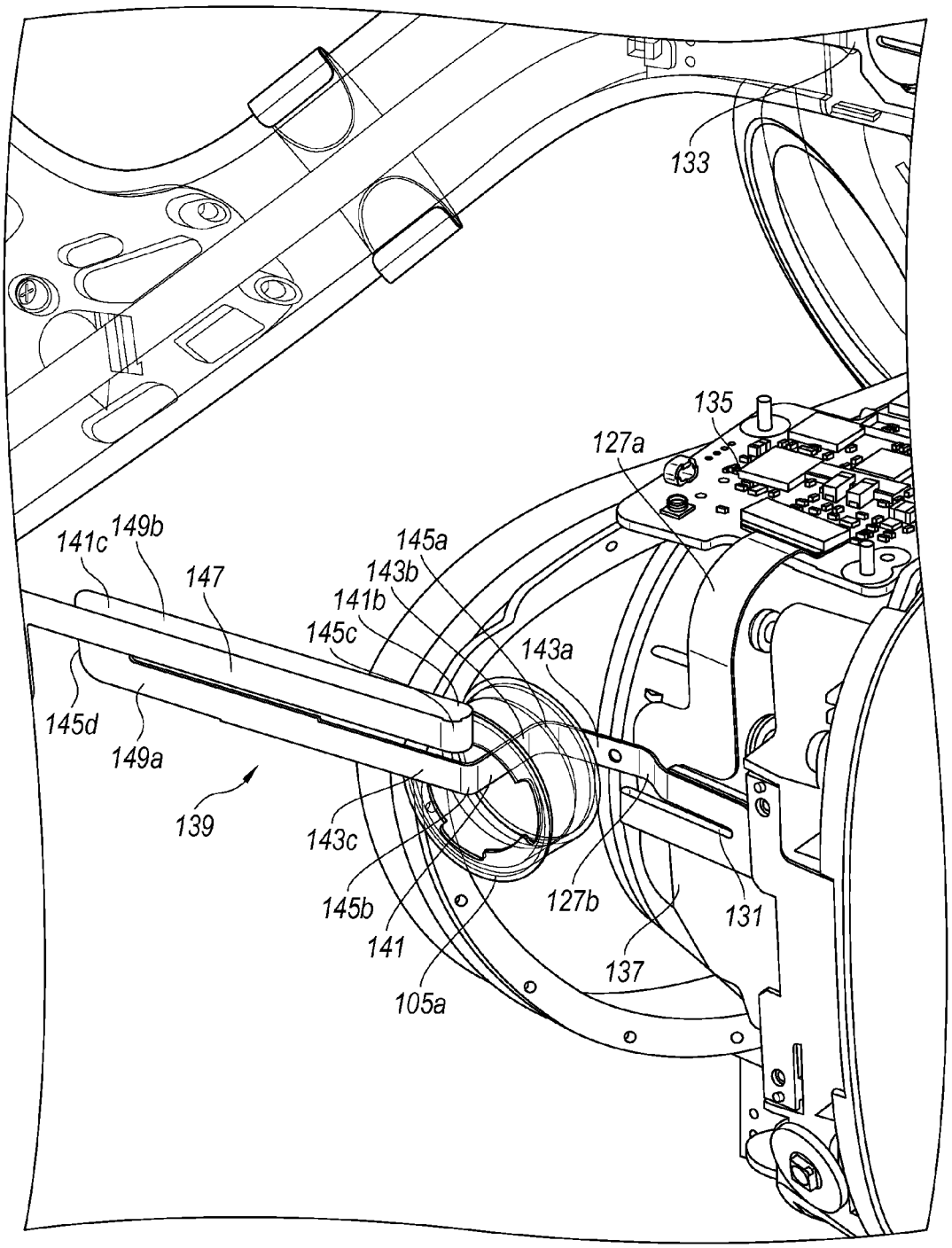
FIG. 2B is an enlarged partial isometric view of a portion of the HMD of FIG. 2A.

FIG. 2B is an enlarged partial isometric view of portions of the front display module 101, the right side of the strap assembly 103, and a portion of the flex circuit 127 extending therethrough. The front display module 101 includes a first circuit board 135 (e.g., a main circuit board) and a second circuit board 137 (e.g., a jumper board) for powering and controlling various components of the HMD 100. In the illustrated embodiment, the flex circuit 127 includes first and second flex circuit portions 127a and 127b, wherein the first flex circuit portion 127a is operatively interconnected to the first and second circuit boards 135 and 137. The second flex circuit portion 127b is connected at one end portion 131 to the second circuit board 137, extends through the right-side joint 105a, and extends rearwardly through the strap assembly 103.

The second flex circuit portion 127b of the illustrated embodiment is connected to the right-speaker assembly 123a, then to the LED module 125 and/or other components coupled to the rear portion 129 of the strap assembly 103, and then terminates at an end portion 133 connected to the left-speaker assembly 123b. Although the HMD 100 of the illustrated embodiment has two circuit boards 135 and 137 interconnected by a portion of the flex circuit 127, the HMD 100 of one or more alternate embodiments can include only one circuit board and a single flex circuit 127 directly connecting the circuit board to various electrical components located on or within the strap assembly 103. In other embodiments, the HMD 100 can include more than two separate circuit boards and/or flex circuits.

As illustrated in FIG. 2B, the second flex circuit portion 127b includes an axially adjustable serpentine loop portion 139 located in the right connector arm 107a (FIG. 1) between the second circuit board 137 and the right-speaker assembly 123a. A forward portion of the serpentine loop portion 139 extends through the right-side joint 105a, and the loop portion 139 has one or more bend portions 141 (e.g., joints, coils, turns, loops, pivots, bights, curves etc.) that allows the loop portion 139 to smoothly and easily move and flex axially as the effective length of the side of the strap assembly 103 is increased or decreased without excessively stretching, straining, pinching, twisting, or otherwise potentially damaging the flex circuit 127. Accordingly, the bend portions 141 in the serpentine loop portion 139 help to allow the strap assembly 103 and/or the front display module 101 to be moved, deflected, or extended rearward and forward, side to side, and/or upward and downward a selected distance relative to each other while maintaining a secure and safe electrical interconnection with the components in, on, or connected to the strap assembly 103.

In the illustrated embodiment, the serpentine loop portion 139 has a generally Z-shaped forward portion 143 with a front leg 143a extending toward the second circuit board 137 in a direction substantially parallel to an axis X (shown in broken line) extending longitudinally between front and rear portions of the HMD 100. A middle leg 143b is integrally connected to the front leg 143a at a first approximately 90-degree bend or bight 145a, extends through the joint 105a, and is connected to a rear leg 143c at a second approximately 90-degree bend or bight 145b. The middle leg 143b is oriented in a direction substantially parallel to a lateral axis Y (shown in broken lines) extending between the left and right sides of the front display module 101 and substantially perpendicular to axis X. The rear leg 143c is substantially parallel to the front leg 143a and the axis X. This generally Z-shaped forward portion 143 is configured to bend and flex at the first and second bights 145a and 145b to accommodate some forward and rearward movement and adjustment between the connector arm 107a relative to the front display module 101 in a direction substantially parallel to the axis X without excessively stressing or straining the flex circuit 127.

The rear leg 143c of the generally Z-shaped forward portion 143 is integrally connected to a U-shaped middle portion 149 of the flex circuit 127. The middle portion 149 has parallel, spaced apart lower and upper legs 149a and 149b, and relative to the orientation as shown in FIG. 2B, the upper and lower legs are positioned in a substantially vertically-oriented plane. It is noted that the middle portion 149 can have a spatial orientation different than in a vertical plane depending upon the relative orientation of the HMD 100. The front end of the lower leg 149a of the middle portion is integrally connected to the rear leg 143c of the Z-shaped forward portion 143. The rear end of the lower leg 149a is integrally attached to a rear end of the middle portion's upper leg 149b at a rear bight 145d. This U-shaped middle portion 149 provides sufficient flexibility or "give" in the flex circuit 127 and allows for movement of portions of the flex circuit 127 in a lateral direction (i.e., substantially parallel to the Y axis) during adjustment or movement of the strap assembly 103 without excessive stress or strain to the flex circuit 127.

In the illustrated embodiment, the forward end of the upper leg 149b of the middle portion 149 is integrally connected to a forward end of a rear leg 147 of the flex circuit 127 at another bight 145c of approximately 180-degrees. The rear leg 147 of the illustrated embodiment is substantially parallel to the upper leg 149b of the middle portion and is spaced laterally apart from the upper leg 149b. From the orientation shown in FIG. 2B, the rear leg 147 of the flex circuit 127 and the upper leg 149b of the middle portion are oriented in a substantially horizontal plane, although the orientation of the flex circuit 127 can have a different spatial orientation depending upon the orientation of the HMD. This U-shaped arrangement between the rear leg 147 and the middle portion's upper leg 149b is such that the flex circuit 127 turns back on itself so as to allow for some axial movement between portions of the rear leg 147 and the upper leg 149b, such as during a shortening or lengthening of the strap assembly at the connector arm 107a. Accordingly, the bight 145c and the U-shape configuration between the rear leg 147 and the upper leg 149b provides sufficient flexibility or "give" in the flex circuit 127 and allows for movement of the flex circuit 127 in an axial direction (i.e., substantially parallel to the Y axis) during adjustment or movement of the strap assembly 103 without excessive stress or strain to the flex circuit 127. The flex circuit 127 in other embodiments can include additional bights or other flex portions that allow for relative movement within the flex circuit during movement or adjustment of the strap assembly without excessive stress or strain on the flex circuits and without providing excessive resistance to such movement in the strap assembly.

The first and second flex circuit portions 127a and 127b can be made of a common material, such as plastic, composite, metal, or other suitable materials sufficiently elastic (e.g., flexible, resilient, deformable) material. This allows the serpentine loop portion 139 with the multiple bends to easily and smoothly elongate, contract, bend, flex, deflect, etc., without being damaged. Accordingly, the flex circuit 127 allows the strap assembly 103 and/or front display module 101 to be moved, extended, or deflected relative to each other, such as when a user removes the HMD 100 from his or her face, or adjusts the position of the front display module 101 relative to his or her face.

Figure 2C:
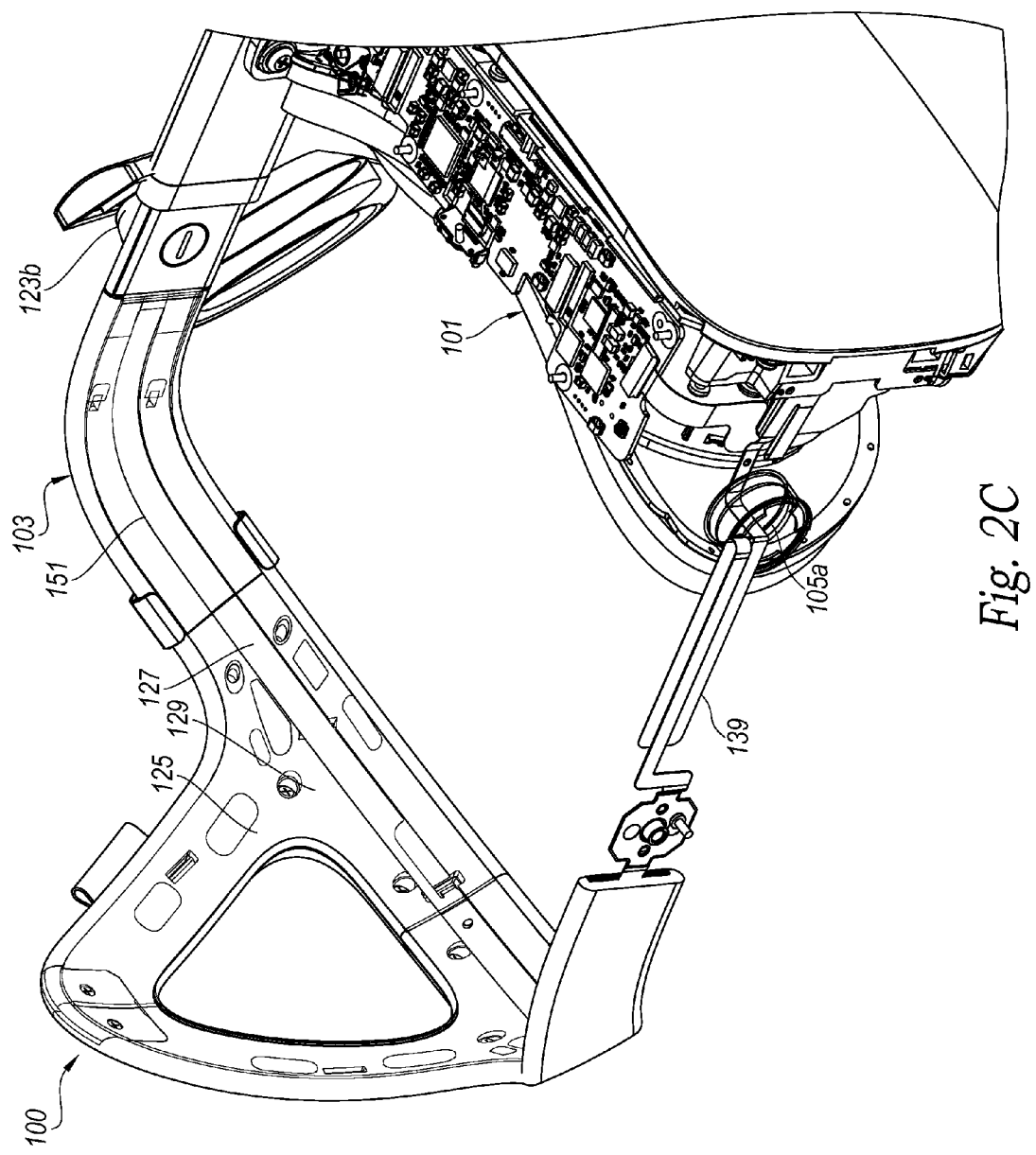
FIG. 2C is an enlarged partial isometric view of another portion of the HMD of FIG. 2A.

FIG. 2C is an enlarged isometric view of a rear portion 129 of the strap assembly 103 and the flex circuit 127 extending therethrough. As illustrated, the flex circuit 127 extends from the right-side speaker assembly 123a through a rear portion of the strap assembly 103 for connection to the rear LED module 125. The flex circuit 127 continues through the strap assembly 103 to connect to the left-side speaker assembly 123b. The rear portion of the strap assembly 103 can include a channel 151 configured to receive the flex circuit 127 as it extends therethrough.

The flex circuit 127 electrically connects the circuit board(s) in the front display module 101 to the strap assembly 103 for providing power and control to various electrical components (e.g., audio input devices, rear LED module, etc.) on or within the strap assembly 103. The flex circuit 127 includes the serpentine loop portion 139 that is expected to allow the strap assembly 103 and/or front display module 101 to be moved, extended, or deflected relative to each other without excessively stressing or straining the flex circuit 127. Accordingly, when a user removes the HMD 100 from his or her face by temporarily moving the strap assembly 103 away from the front display module 101 or adjusts the position of the front display module 101 relative to his or her face, the serpentine loop portion 139 provides sufficient flexibility or "give" in the flex circuit 127 so that it can easily, smoothly, and safely flex, extend, deflect, or otherwise move in one or more directions.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

We claim:

1. A head mounted display for use with a virtual reality system, comprising:

a front display module containing optics, at least one circuit board, and one or more displays coupleable to the virtual reality system, the display module having opposing lateral sides;

an adjustable strap assembly connected to the front display module and having opposing first and second connector arms positioned adjacent to the lateral sides of the front display module, the first and second connector arms being coupled to opposing lateral sides of the display module, and wherein the strap assembly comprises at least one electronic component located thereon; and a flex circuit contained in the strap assembly and coupled to the circuit board and the electronic component for powering and controlling the electronic component, wherein the flex circuit comprises a serpentine portion configured to allow axial movement of at least a portion of the adjustable strap assembly relative to the front display module, wherein the serpentine portion comprises parallel first, second, and third legs, a first intermediate portion interconnecting the first and second legs, and a second intermediate portion interconnecting the second and third legs, wherein the first and second legs are in a common first plane, and the second and third legs are in a second plane different than the first plane.

2. The head mounted display of claim 1 wherein each of the first and second connector arms are coupled to the opposing lateral sides of the display module at first and second respective joints and wherein the flex circuit extends from the front display module through one of the first and second joints into the strap assembly.

3. The head mounted display of claim 1 wherein the serpentine portion is contained in the first or second connector arm and configured to allow axial movement of the first or second connector arm relative to the front display module without damaging the flex circuit.

4. The head mounted display of claim 3 wherein the serpentine portion comprises one or more orthogonally oriented bends configured to allow the flex circuit to deflect without being damaged when the strap assembly and/or front display module are moved relative to each other.

5. The head mounted display of claim 1 wherein the first and second planes are orthogonally oriented relative to each other.

6. The head mounted display of claim 1 wherein the first intermediate portion is a substantially U-shaped portion positioned to allow portions of the first and second legs to move laterally relative to each other and relative to the front display module.

7. The head mounted display of claim 1 wherein the second intermediate portion is a substantially U-shaped portion positioned to allow portions of the third and second legs to move axially relative to each other and relative to the front display module.

8. The head mounted display of claim 1 wherein the at least one electrical component comprises an LED module positioned within the strap assembly.

9. The head mounted display of claim 1 wherein the strap assembly comprises one or more head straps and a channel within the one or more head straps that contains the flex circuit.

10. The head mounted display of claim 1 wherein the at least one circuit board comprises a first circuit board and a second circuit board, wherein the flex circuit comprises a first circuit portion and a second circuit portion, wherein the first circuit portion couples the first circuit board to the second circuit board, and the second circuit portion couples the second circuit board to the electronic component.

11. The head mounted display of claim 10 wherein the second circuit portion comprises the serpentine portion having multiple bends configured to allow the flex circuit to deflect at least one of laterally or axially without damaging the flex circuit when the portion of the strap assembly is temporarily moved away from the front display module.

12. A head mounted display for use with a virtual reality system, comprising:
a front display module containing optics, one or more circuit boards, and one or more displays coupleable to the virtual reality system; and
a strap assembly having a strap portion, one or more electronic components mounted on the strap portion, and an integral flex circuit operatively interconnecting the one or more electronic components and the one or more circuit boards, wherein the flex circuit comprises a serpentine loop portion configured to allow axial movement of the strap assembly relative to the front mounted display, the serpentine loop portion has parallel first, second, and third legs, a first intermediate portion interconnecting the first and second legs, and a second intermediate portion interconnecting the second and third legs, wherein the first and second legs are in a common first plane, and the second and third legs are in a second plane different than the first plane.

13. The head mounted display of claim 12 wherein the first and second intermediate portions have substantially orthogonally oriented bends.

14. The head mounted display of claim 12 wherein the flex circuit extends from the display module into the strap assembly through a joint coupling a lateral side portion of the display module to the strap assembly.

15. The head mounted display of claim 12 wherein the one or more electronic components comprises an LED module carried by the strap portion and in electrical connection with the flex circuit.

16. The head mounted display of claim 12 wherein the flex circuit includes an elastically deformable material.

17. A strap assembly for a head mounted display of a virtual reality system, wherein the head mounted display has a front display module, comprising:
a head mountable strap portion;
opposing first and second connector arms connected to the head-mountable strap portion and being positionable adjacent to lateral sides of the front display module, the first and second connector arms being coupleable to opposing lateral sides of the front display module;
at least one electronic component connected to the strap portion away from the front display module; and
a flex circuit connected to at least one of the first and second connector arms and electronically interconnecting the at least one electronic component and the front display module, the flex circuit comprises a serpentine portion configured to allow axial movement of at least a portion of the at least one of the first and second connector arms relative to the front display module, the serpentine portion has parallel first, second, and third legs, a first intermediate portion interconnecting the first and second legs, and a second intermediate portion interconnecting the second and third legs, wherein the first and second legs are in a common first plane, and the second and third legs are in a second plane different than the first plane.

18. The strap assembly of claim 17 wherein the serpentine portion is contained in the at least one of the first and second connector arms and configured to allow axial movement of the at least one of the first and second connector arms relative to the front display module without interrupting the electrical connection between the electronic component and the front display module.

19. The strap assembly of claim 18 wherein the first and second intermediate portions of the serpentine portion have substantially orthogonally oriented bends.

* * * * *